United States Patent
Kim et al.

(10) Patent No.: US 8,027,294 B2
(45) Date of Patent: Sep. 27, 2011

(54) APPARATUS AND METHOD FOR TRANSMITTING OFDMA SYMBOLS

(75) Inventors: Jong Kuk Kim, Suwon-si (KR); Hyoung Chang Kang, Seoul (KR); Kyoung Bong You, Anyang-si (KR)

(73) Assignee: LG-Ericsson Co., Ltd., Seoul (KR)

( * ) Notice: Subject to any disclaimer, the term of this patent is extended or adjusted under 35 U.S.C. 154(b) by 959 days.

(21) Appl. No.: 11/940,697

(22) Filed: Nov. 15, 2007

(65) Prior Publication Data

US 2008/0117872 A1 May 22, 2008

(30) Foreign Application Priority Data

Nov. 16, 2006 (KR) .................. 10-2006-0113162

(51) Int. Cl.
*H04W 4/00* (2009.01)
*H04J 3/16* (2006.01)

(52) U.S. Cl. ........................ 370/329; 370/468

(58) Field of Classification Search ............... None
See application file for complete search history.

(56) References Cited

U.S. PATENT DOCUMENTS

| | | | |
|---|---|---|---|
| 2003/0235252 A1* | 12/2003 | Tellado et al. ............... | 375/259 |
| 2005/0249157 A1* | 11/2005 | Qian et al. .................... | 370/329 |
| 2006/0008020 A1* | 1/2006 | Blankenship et al. ........ | 375/261 |
| 2006/0034164 A1* | 2/2006 | Ozluturk ....................... | 370/208 |
| 2006/0252389 A1* | 11/2006 | Yellin et al. ................ | 455/115.3 |
| 2007/0110003 A1* | 5/2007 | Tujkovic et al. ............. | 370/335 |
| 2007/0117570 A1* | 5/2007 | Noh et al. ................... | 455/452.2 |
| 2008/0259854 A1* | 10/2008 | Sumasu ........................ | 370/329 |
| 2009/0042532 A1* | 2/2009 | Bienas et al. ................ | 455/403 |
| 2009/0093253 A1* | 4/2009 | Hayashi et al. .............. | 455/436 |
| 2010/0027450 A1* | 2/2010 | Montojo et al. .............. | 370/311 |

* cited by examiner

*Primary Examiner* — Steven H Nguyen
(74) *Attorney, Agent, or Firm* — KED & Associates, LLP (57) ABSTRACT

Embodiments of the present invention may provide an apparatus and a method for transmitting an orthogonal frequency division multiplexing access (OFDMA) symbol in an OFDMA system. A bandwidth limit parameter for generating an OFDMA symbol may be adaptively determined based on the received signal quality of a receiver. An OFDMA symbol may be generated based on the bandwidth limit parameter and transmitted to the receiver. According to embodiments, when the received signal quality of the receiver is bad, the bandwidth limit parameter may be first adjusted before the modulation scheme is changed to have a lower data rate. In such a case, the downlink date rate may be maintained with enhancing the received signal quality of the receiver.

9 Claims, 4 Drawing Sheets

APPARATUS AND METHOD FOR TRANSMITTING OFDMA SYMBOLS

The present application claims priority from Korean Patent Application No. 10-2006-113162 filed on Nov. 16, 2006, the entire subject matter of which is incorporated herein by reference.

BACKGROUND

1. Field

Embodiments of the present invention may relate to an apparatus and method for transmitting an orthogonal frequency division multiplexing access (OFDMA) symbol in a radio access system (RAS) of an OFDMA system. More particularly, embodiments of the present invention may relate to an apparatus and method for transmitting an OFDMA symbol based on an adaptive control of a bandwidth limit parameter to enhance a downlink data rate of a WiBro RAS.

2. Background

In the next generation of radio access network such as wireless broadband (WiBro) and world interoperability for microwave access (WiMAX) system, a signal is transmitted in the OFDMA scheme to provide a high data rate service to mobile users. The OFDMA scheme is advantageous since it can cope with problems of terrible frequency selective fading channels due to multi path fading in a radio access system with a high data rate. In the OFDMA scheme, the carriers that are appropriately arranged in the OFDMA signal may be received without interferences due to adjacent carriers. Although the sidebands of the adjacent carriers in the OFDMA signal are overlapped, the carriers are arranged to be orthogonal to each other in the entire OFDMA signal. Thus, they do not interfere with each other.

A guard interval is inserted between two adjacent OFDMA symbols to prevent inter symbol interference (ISI) due to interferences between the adjacent OFDMA symbols, as well as inter carrier interference (ICI) due to crosstalk between the adjacent sub carriers. The guard interval is longer than the maximal delay spread of the channel. Therefore, the symbol duration is a sum of the valid symbol duration, during which the data is actually transmitted, and the guard interval. The receiver removes the guard interval and then demodulates the data for the valid symbol duration. The last signal of the valid symbol duration is duplicated and inserted to the guard interval to maintain the orthogonal characteristics of carriers, which are referred to as cyclic prefix (CP).

The frequency spectrum of the OFDMA signal is a sum of sinc functions, each of which is a frequency function of each sub carrier. If the interval between the adjacent sub carriers is an integer multiple of a reciprocal of the valid symbol duration, then the orthogonal characteristics are maintained. However, the bad roll off characteristics of the sinc function causes the adjacent channel interference to generate. Thus, a band limit filter or a window such as root raised cosine (RRC) is used to remove or decrease out of band spectrum components in order to decrease the adjacent channel interference. Such a window or filter determines a spectrum mask that reduces the ISI and an error vector magnitude (EVM).

Until now, mobile communication systems have been developed to be compliant with specifications, with several reference parameters of the specifications such as a bandwidth limit parameter, being fixed. For example, in the transceiver of WiBro RAS (made by LG-Nortel), the radio frequency (RF) unit has been developed based on the fixed bandwidth limit parameter at the output of the modem.

A symbol is modulated to transmit in binary phase shift keying (BPSK), quadrature phase shift keying (QPSK), 16 quadrature amplitude modulation (QAM) or 64 QAM. Accordingly, the above four modulation schemes are utilized to adjust the data rate to maintain a highest downlink data rate as possible, if the received signal quality of a receiver is not sufficiently good due to noise (e.g., white noise) in the radio air or a long distance between the transmitter and the receiver such as a mobile station or relay. For example, the transmitter transmitting a symbol with 64 QAM lowers the data rate to 16 QAM in response to receiving continual repeat requests from the receiver such as a mobile station to maintain the received signal quality of the receiver at a certain level.

However, if the modulation scheme is changed to have a lower data rate for maintaining the received signal quality of the receiver at a certain level, then it is difficult to maintain transmitting data at a high data rate. The inconvenience of the mobile station users increases since a significant amount of data cannot be transmitted at a high data rate at a time. Further, the bandwidth cannot be efficiently utilized since the number of coded bits per sub carrier decreases.

Therefore, the objective of embodiments according to the present invention is to provide an apparatus and method for transmitting an OFDMA symbol to enable the highest downlink data rate. According to the embodiments, the bandwidth limit parameter may be first adjusted before the modulation scheme is changed to have a lower data rate.

BRIEF DESCRIPTION OF THE DRAWINGS

Arrangements and embodiments may be described in detail with reference to the following drawings in which like reference numerals refer to like elements and wherein.

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Figure 1:
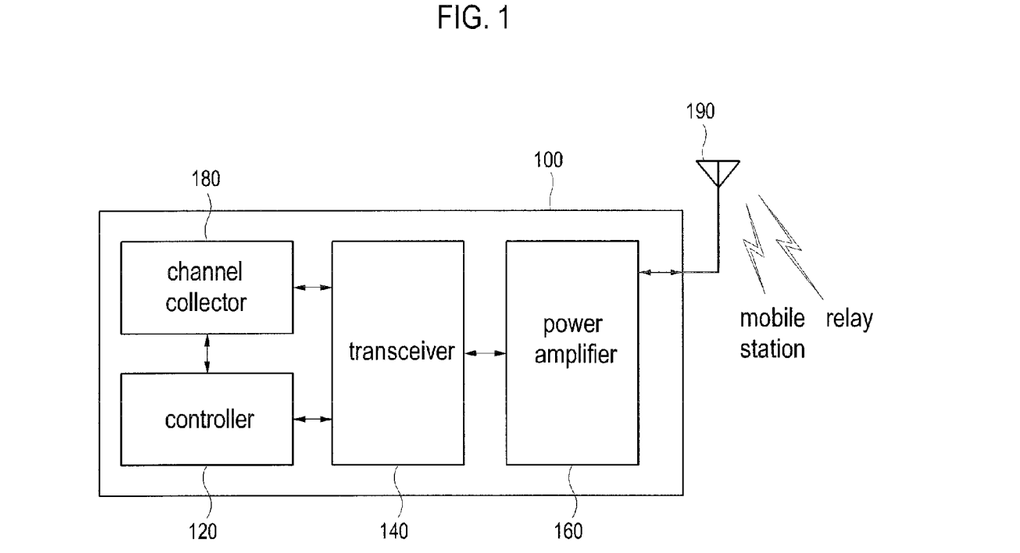
FIG. 1 illustrates an OFDMA transmitting apparatus according to an example arrangement.

FIG. 1 illustrates an OFDMA transmitting apparatus according to an example arrangement. Other arrangements may also be used. As shown in FIG. 1, the OFDMA system may include a controller 120, a transceiver 140, a power amplifier 160, a channel collector 180 and an antenna 190. The controller 120 may manage/control radio access to a mobile station or a relay, radio access resources, etc. The transceiver 140 may perform modulation/demodulation, digital to analog conversion and frequency band conversion of a digital signal for transmission to a desired frequency band. The power amplifier 160 may amplify the power of the signal processed in the transceiver 140 and the amplified signal may be transmitted via the antenna 190. The channel collector 180 may collect the processing results of the transceiver 140, etc. and store channel information for each user.

The controller 120 may change a symbol modulation scheme to enhance the received signal quality of a receiver, if the received signal quality does not satisfy the requirements, i.e., bit error rate (BER) or symbol error rate (SER) at the receiver becomes higher due to noise (e.g., white noise) in the radio air or a long distance between an RAS and a mobile station. For purposes of explanation, the modulation schemes in an OFDMA system according to an embodiment will be described first.

A modulation may include converting user data information to an electric signal for storing and transmitting the information. Specifically, an amplitude, a frequency or a phase of the carrier signal may be changed based on the information to generate a modulation signal. As is known in the art, modulating a signal may be advantageous in sharing a transmission medium among a plurality of users (multiple access), adapting a signal to a transmission medium physically. An apparatus to modulate a signal is called "a modulator" and an apparatus to recover an original signal from a modulated signal is called "demodulator." According to an embodiment, the modulator and the demodulator may be included in the transceiver 140.

The modulation schemes in WiBro RAS may include binary phase shift keying (BPSK), quadrature phase shift keying (QPSIK), 16 quadrature amplitude modulation (QAM) and 64 QAM. In the BPSK, a binary signal may correspond to a phase of a carrier wave having a constant amplitude and constant frequency. In the QPSK, 2 bit information may be transmitted at once. For example, each 2 bit information of 00, 01, 10 and 11 may be transmitted by changing the phase of a carrier wave by 90°. In the QAM, two carrier waves perpendicular to each other may be amplitude-phase-shifted to transmit two types of information in the same band. In the QAM, both an amplitude and phase of a carrier wave may be modulated to enhance the data transmission rate within the limited band. Thus, the transmitted carrier wave may have, e.g., 16 levels or 64 levels, in a symbol. The BPSK modulation may support, e.g., 6 Mbps and 9 Mbps, the QPSK may support 12 Mbps and 19 Mbps, the 16 QAM may support 27 Mbps and 36 Mbps, and the 64 QAM may support 54 Mbps.

An OFDMA symbol may be generated from the above-mentioned modulated digital symbol as explained below. For $N_c$ digital symbols, which may be QAM symbols or QPSK symbols, $N-N_c$ "0"s may be added to form input N symbols and inverse fast fourier transform (IFFT) may be performed for the input N symbols.

Figure 2:
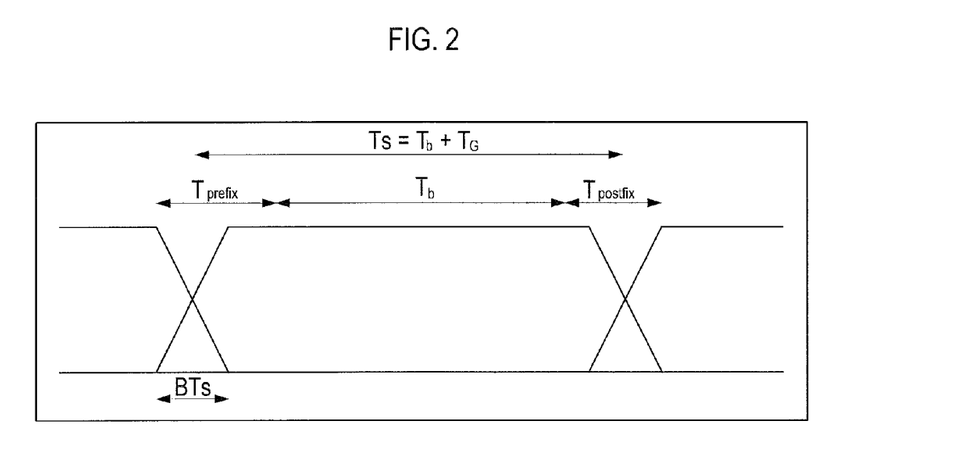
FIG. 2 illustrates an OFDMA symbol configuration in the time domain.

FIG. 2 illustrates an OFDMA symbol configuration in the time domain. As shown in FIG. 2, the last $T_{prefix}$ samples of the IFFT samples may be inserted to the start of the OFDMA symbol. Further, the start $T_{prefix}$ samples of the IFFT samples may be added to the end of the OFDMA symbol. Then, a window may be applied to the OFDMA symbol for multiplication to decrease the power of the sub carriers out of the band. $T_g$ is a guard interval, $T_b$ is a valid symbol duration, $T_s$ is an OFDMA symbol duration, $T_{prefix}$ is a pre-guard interval and $T_{postfix}$ is a post-guard interval. As shown in FIG. 2, $T_s$ may be shorter than the entire symbol time since the adjacent symbols overlap partly in the roll off region. The transmitted signal s(n) may be represented by the following Equation 1:

$$s(n) = w(n) * \sum_{k=-N_{used}/2, k \neq 0}^{N_{used}/2} b_k \exp((j2\pi k \Delta f)(n - N_g)) \quad (1)$$

$$n = -m, -m+1, \ldots, 0, \ldots, N_s + m$$

wherein n is a time index, $b_k$ is a signal in the frequency domain for the k-th sub carrier, $\Delta f$ is a frequency interval between adjacent two sub carriers, $N_g$ is the number of OFDMA symbols for $T_g$, $N_{used}$ is the number of used sub carriers, and w(n) is a window function in the time domain for decreasing an out of band emission, which may be represented by the following Equation 2:

$$w(n) = \begin{cases} 0.5\left(1 + \cos\left\{\pi\left(1 + \frac{n+m}{2m}\right)\right\}\right) & -m \leq n \leq m \\ 1 & m < n \leq (N_s - m) \\ 0.5\left(1 + \cos\left\{\pi\left(\frac{n - (N_s - m)}{2m}\right)\right\}\right) & (N_s - m) < n \leq (N_s + m) \end{cases} \quad (2)$$

wherein $N_s$ is the number of OFDMA symbols for $T_s$, m is a bandwidth limit parameter, and 2m is the number of OFDMA symbols for $T_{prefix}$ and $T_{postfix}$.

Figure 3:
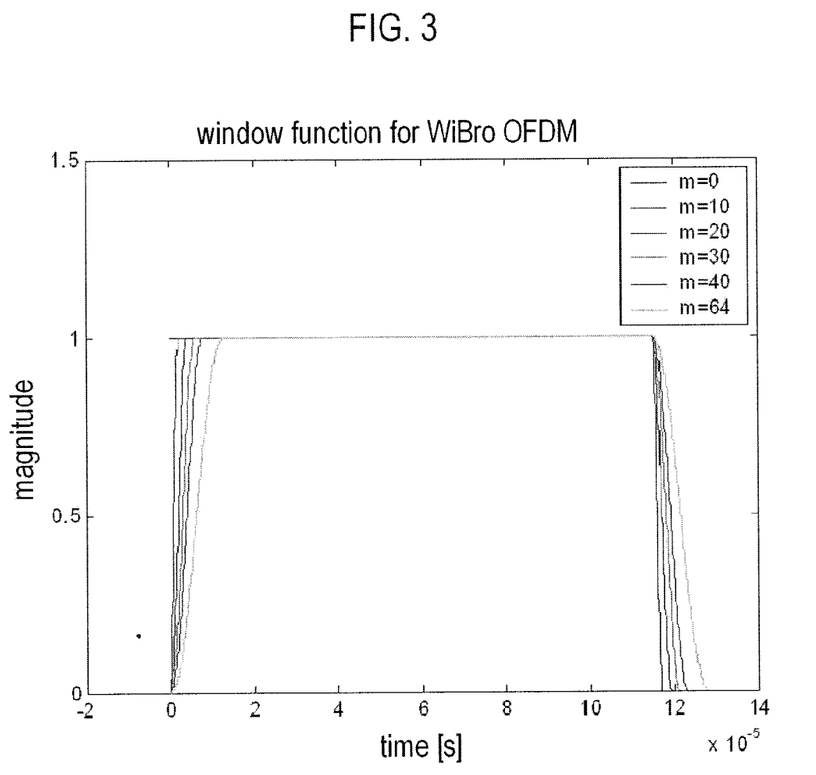
FIG. 3 illustrates a relationship between a bandwidth limit parameter m and a window function in the time domain.

FIG. 3 illustrates a relationship between a bandwidth limit parameter m and a window function in the time domain. Referring to FIG. 3, if m is 0, then the window function is rectangular shaped. As m becomes larger, the rectangularity of the window function becomes weaker. The frequency characteristics W(f) of the window function w(n) may be represented by the following Equation 3: (see "Digital Communications" written by Proakis)

$$W(f) = \frac{\sin(\pi \cdot f \cdot T_s)}{\pi \cdot f \cdot T_s} \cdot \frac{\cos(\beta \cdot \pi \cdot f \cdot T_s)}{1 - (2 \cdot \beta \cdot f \cdot T_s)^2}, \beta = \frac{2 \cdot m}{N_s} \quad (3)$$

wherein $\beta$ is a roll off factor and $\beta T_s$ is a region where the previous and the current OFDMA symbols are overlapped.

As explained with respect to FIG. 2, the previous OFDMA symbol may be added to the current OFDMA symbol. Equation 3 is explained in more detail with respect to FIG. 4.

Figure 4:
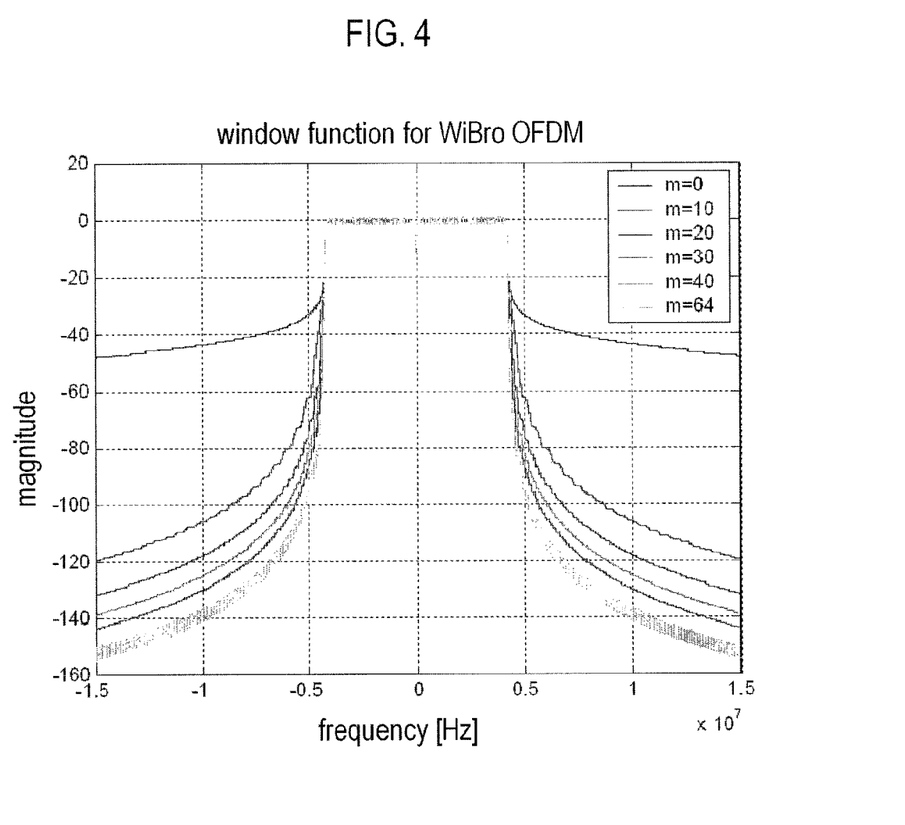
FIG. 4 illustrates a relationship between a bandwidth limit parameter m and a window function in the frequency domain.

FIG. 4 illustrates a relationship between a bandwidth limit parameter m and a window function in the frequency domain. The relationship shown in FIG. 4 is obtained by taking a convolution of the frequency characteristics W(f) with the window function w(n) with $N_{used}$, the number of the sub carriers, e.g., 864 sub carriers (impulses) in the frequency domain. 864 is an example number without limitation. As shown in FIG. 4, as the bandwidth limit parameter m becomes larger (e.g., from 0 to 10), a spectrum mask (decreasing an out of band emission) enhances. However, as the bandwidth limit parameter m becomes larger, the overlapping region in the time domain increases. In such a case, symbol spread in the receiver due to the multi path delay may be a problem.

Figure 5:
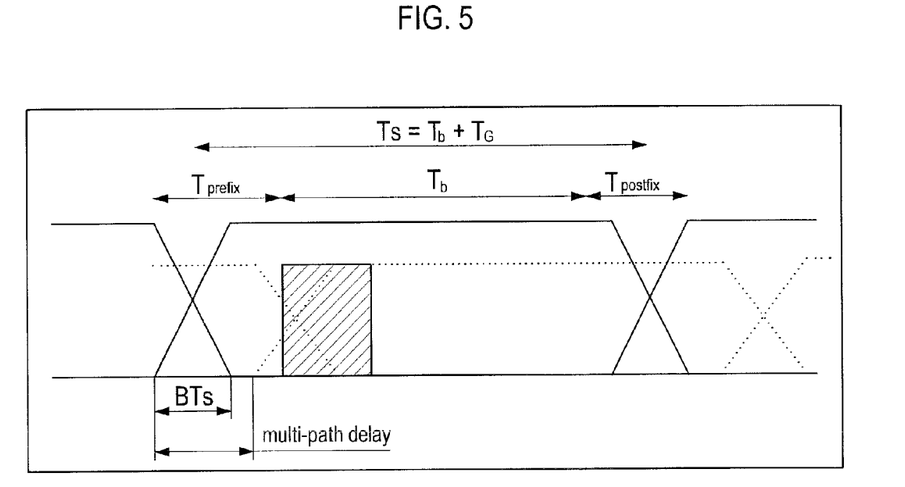
FIG. 5 illustrates an OFDMA symbol received through two paths.

FIG. 5 illustrates an OFDMA symbol received through two paths. Similar to FIG. 2, $T_g$ is a guard interval, $T_b$ is a valid symbol duration, $T_s$ is an OFDMA symbol duration, $T_{prefix}$ is a pre-guard interval and $T_{postfix}$ is a post-guard interval. The solid line represents an OFDMA signal received in the first path ("first path signal") and the dotted line represents an OFDMA signal received in the second path ("second path signal"). The second path signal is delayed compared to the first path signal by $T_d$. The receiver may demodulate the received signal by performing fast fourier transform (FFT) upon the received signal for T, which includes the previous symbol and the roll off value due to the delayed OFDMA signal. For this reason, inter channel interference (ICI) or inter symbol interference (ISI) may be generated. As such, ICI or ISI may be generated depending on the roll off, although the relative delay $T_d$ of the second path signal to the first path signal is less than the guard interval $T_g$. The orthogonal characteristics of sub carriers in the OFDMA system can be maintained when the amplitudes and the phases of sub carriers are constant during the valid symbol duration $T_b$. Accordingly, if the roll of factor is, $\beta$, then the valid guard interval decreases by $\beta T_s$. Thus, it is important to determine appropriate $\beta T_s$ for enhancing the receiver performance in the OFDMA communications. FIG. 5 illustrates two paths for explanation. However, the present invention is not limited thereto. Actually, WiBro RAS is susceptible to multi path fading. The fading may be dependent on time or on whether the system is operating in city or in suburb. Accordingly, the transceiver may determine $\beta$ adaptively to enhance the RAS system. Referring back to FIG. 4, as the bandwidth limit parameter m increases, the spectrum characteristics enhance. However, if the bandwidth limit parameter m is larger than 64, the orthogonal characteristics of sub carriers may not be maintained since the curved portion of the window overlaps the symbol in the frequency domain. Therefore, the requirements for the bandwidth limit parameter m may be represented by the following Equation 4:

$$0 < m < m_{max} - L \quad (4)$$

wherein $m_{max}$ is a maximal bandwidth limit parameter such that the curved portion of the window does not overlap with the OFDMA symbol in the frequency domain, and L is a length of the channel impulse response. As explained above, considering the conflicting effects of the bandwidth limit parameter m on the spectrum mask, and on EVM and Rho (correlation value with a signal) affecting downlink throughput, a trade-off may be made to adjust the bandwidth limit parameter m. In other words, as the bandwidth limit parameter m is closer to an upper limit $m_{max}$, e.g., 64 in FIG. 4, the spectrum mask enhances. However, the synchronization of a received symbol or the accurate recovery of a received frame in the receiver such as a mobile station or a relay becomes more difficult. On the contrary, as the bandwidth limit parameter m is closer to a lower limit, e.g., 0 in FIG. 4, the synchronization of a received symbol or the accurate recovery of a received frame in the receiver enhances. However, the spectrum mask of the window becomes worse, which makes it hard to satisfy the mask requirements for RAS.

Referring back to FIG. 1, the controller 120 may control the bandwidth limit parameter m based on the received signal quality of the receiver, if the received signal quality of the receiver is bad, or in response to receiving an automatic repeat request (ARQ) such as negative acknowledgement (NACK: a response to a packet error or setting error) or a repeat request. The controller 120 may change the bandwidth limit parameter m to be within the requirements of Equation 4. The controller 120 may change a current modulation scheme to have a lower data rate, e.g., from 64 QAM to 16 QAM or to have a higher data rate, e.g., from 16 QAM to 64 QAM, if the changed bandwidth limit parameter does not satisfy the requirements of Equation 4. The modulation scheme determined in the controller 120 is explained in more detail with reference to FIG. 6.

Figure 6:
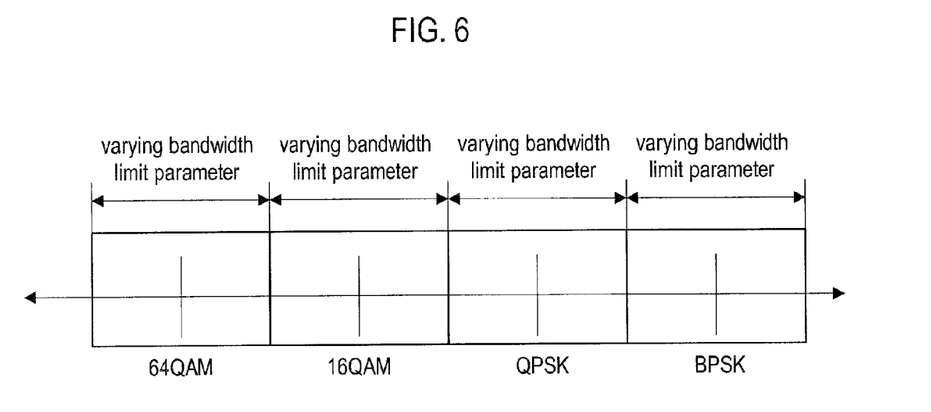
FIG. 6 illustrates a bandwidth limit parameter m and a data rate that vary depending on the received signal quality of a receiver according to an example embodiment.

FIG. 6 illustrates a bandwidth limit parameter m and a data rate that vary depending on the received signal quality of a receiver according to an example embodiment. As shown in FIG. 6, the x axis is BER of the received signal, which increases in the right direction. Thus, the received signal quality becomes worse in the right direction. The BER is only an example of the received signal quality and any criterion, whose value is reciprocal to the received signal quality, may be used. As shown in FIG. 6, a symbol modulation scheme may be changed to 64 QAM 620, 16 QAM 640, QPSK 660 and BPSK 680 depending on the BER. In other words, as the received signal quality is better, a modulation scheme having a higher data rate may be selected. As the received signal quality is worse, a modulation scheme having a lower data rate may be selected to maintain the received signal quality of the receiver at a certain level. Further, for the same data rate, when the received signal quality is good, the controller 120 may limit the bandwidth more, i.e., increase the bandwidth limit parameter m to enhance the receiver performance. Similarly, for the same data rate, when the received signal quality is bad, the controller 120 may limit bandwidth less, i.e., decrease the bandwidth limit parameter m to enhance the receiver performance. Therefore, the controller 120 may change the bandwidth limit parameter m to be within the requirements of Equation 4 before changing the modulation scheme when the received signal quality (BER) becomes a certain value. The controller 120 may increase the bandwidth limit parameter m to limit the bandwidth more, if the received signal quality is good. Similarly, the controller 120 may decrease the bandwidth limit parameter m to limit the bandwidth less, if the received signal quality is bad. The controller 120 may change the data rate (modulation scheme), if the changed bandwidth limit parameter m does not satisfy the requirements of Equation 4. For example, the controller 120 may change the data rate to a higher value, if the value of the bandwidth limit parameter m exceeds the upper limit. Thereafter, the controller 120 may change the bandwidth limit parameter m according to the changed higher data rate. Similarly, the controller 120 may change the data rate to a lower value, if the bandwidth limit parameter m is less than the lower limit. Then, the controller 120 may change the bandwidth limit parameter m according to the changed lower data rate.

Similarly, the controller 120 may decrease the bandwidth limit parameter m to limit the bandwidth less in response to receiving the repeat request from the receiver. Thereafter, if a repeat request is not received, then the controller 120 may maintain the bandwidth limit parameter m and the data rate. If a repeat request is still received from the receiver after a symbol with the decreased bandwidth limit parameter m is transmitted, then the controller 120 may change the bandwidth limit parameter m to the minimal value within the requirements of Equation 4. If a repeat request is still received from the receiver after a symbol with the minimal bandwidth limit parameter m is transmitted, then the controller 120 may change the modulation scheme to have a lower data rate.

According to an embodiment, the bandwidth limit parameter m may be first adjusted with the same modulation scheme. Therefore, the received signal quality may be enhanced with a higher data rate compared to the conventional techniques, in which the modulation scheme is changed to have a lower data rate unconditionally in response to receiving the repeat request.

Referring back to FIG. 1 again, the transceiver 140 may use digital I/Q channel signals to monitor the spectrum mask and the received signal quality in real time. The transceiver 140 reports to the controller 120 in response to increasing the BER of the receiver or in response to receiving the repeat request from the receiver. The transceiver 140 may use a pilot signal to estimate the BER of the receiver. The pilot signal is transmitted from the receiver to the transmitter to acquire synchronization timing or a reference carrier for demodulation. The pilot signal is robust since it is a BPSK signal having a larger Euclidean distance than 16 QAM or 64 QAM. The transceiver 140 may utilize a data stream having a determined pattern as a stimulation signal in the partial usage of the sub channel (PUSC) of a user data channel during pilot signal ranging to measure the BER of the mobile station.

An example embodiment may be achieved in whole or in part by an apparatus for transmitting an orthogonal frequency division multiplexing access (OFDMA) symbol in an OFDMA system. The apparatus may include a transceiver to monitor the received signal quality of a receiver. The apparatus may also include a controller to adaptively determine a bandwidth limit parameter based on the received signal quality. The transceiver may generate an OFDMA symbol based on the bandwidth limit parameter to transmit to the receiver.

The controller may determine whether a value to limit bandwidth less than previous bandwidth limit parameter violates bandwidth limit requirements for the OFDMA system when the current received signal quality is worse than the previous received signal quality. If the value to limit bandwidth less does not violate the bandwidth limit requirements, then the controller may determine the bandwidth limit parameter as the value to limit bandwidth less. If the value to limit bandwidth less violates the bandwidth limit requirements, then the controller may determine a modulation scheme including a low data rate and determine the bandwidth limit parameter based on the modulation scheme including the low data rate. The controller may determine whether a value to limit bandwidth more than the previous bandwidth limit parameter violates the bandwidth limit requirements for the OFDMA system when the current received signal quality is better than the previous received signal quality. If the value to limit bandwidth more does not violate the bandwidth limit requirements, then the controller may determine the bandwidth limit parameter as the value to limit bandwidth more. If the value to limit bandwidth more violates the bandwidth limit requirements, then the controller may determine a modulation scheme including a high data rate and determine the bandwidth limit parameter based on the modulation scheme including the high data rate.

Another example embodiment may be achieved in whole or in part by a method of transmitting an orthogonal frequency division multiplexing access (OFDMA) symbol in an OFDMA system. The method may include monitoring the received signal quality of a receiver. The method may also include determining a bandwidth limit parameter adaptively based on the received signal quality. The method may also include generating an OFDMA symbol based on the bandwidth limit parameter to transmit to the receiver.

According to embodiments, in response to receiving continual repeat requests from the receiver such as a mobile station, the bandwidth limit parameter may be first adjusted without changing the modulation scheme to have a lower data rate. Therefore, the downlink data rate may be maintained higher.

According to embodiments, in response to receiving a repeat request, it may be unnecessary to change the modulation scheme to have a lower data rate. Thus, a significant amount of data may be transmitted at a high data rate to increase the mobile station users' convenience. Further, the bandwidth limit parameter is not fixed but may be adjusted freely to facilitate the efficient use of the system.

While embodiments of the present invention and its various functional components may have been described in particular embodiments, it should be appreciated that embodiments of the present invention can be implemented in hardware, software, firmware, middleware or a combination thereof and utilized in systems, subsystems, components or sub-components thereof. When implemented in software, elements of embodiments of the present invention may include instructions/code segments for performing tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g., a processor, a computer, etc.).

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure or characteristic is described in connection with any embodiment, it is submitted that it is within the purview of one skilled in the art to effect such feature, structure, or characteristic in connection with other ones of the embodiments.

Further, while embodiments of the present invention have been shown and described with respect to an embodiment, those skilled in the art will recognize that various changes and modifications may be made without departing from the spirit and scope of the invention as defined in the appended claims.

What is claimed is:

1. An apparatus for transmitting an orthogonal frequency division multiplexing access (OFDMA) symbol in an OFDMA system, comprising:
   a transceiver to monitor a received signal quality of a receiver; and
   a controller to adaptively determine a bandwidth limit parameter based on the monitored received signal quality of the receiver,
   wherein the controller determines whether a value to limit bandwidth less than a previous bandwidth limit parameter violates bandwidth limit requirements for the OFDMA system when a currently received signal quality of the receiver is less than a previously received signal quality of the receiver, and
   when the value to limit bandwidth less than the previous bandwidth limit parameter does not violate the bandwidth limit requirements, the controller determines the bandwidth limit parameter as the value to limit bandwidth less than the previous bandwidth limit parameter, and
   when the value to limit bandwidth less than the previous bandwidth limit parameter violates the bandwidth limit requirements, the controller determines a modulation scheme that includes a low data rate and determines the bandwidth limit parameter based on the determined modulation scheme that includes the low data rate, and
   the controller determines whether a value to limit bandwidth more than the previous bandwidth limit parameter violates the bandwidth limit requirements for the OFDMA system when the currently received signal quality of the receiver is better than the previously received signal quality of the receiver, and when the value to limit bandwidth more than the previous bandwidth limit parameter does not violate the bandwidth limit requirements, the controller determines the bandwidth limit parameter as the value to limit bandwidth more than the previous bandwidth limit parameter, and when the value to limit bandwidth more than the previous bandwidth limit parameter violates the bandwidth limit requirements, the controller determines a modulation scheme that includes a high data rate and determines the bandwidth limit parameter based on the determined modulation scheme that includes the high data rate, and wherein the transceiver generates an OFDMA symbol based on the determined bandwidth limit parameter to transmit to the receiver.

2. The apparatus of claim 1, wherein the bandwidth limit requirements have a bandwidth limit parameter such that a window is rectangular-shaped in time domain as a lower limit, and a maximal bandwidth limit parameter such that a curved portion of the window is not overlapped with the OFDMA symbol in frequency domain as an upper limit.

3. The apparatus of claim 1, wherein the OFDMA system is an wireless broadband (WiBro) system, and the apparatus is located in a radio access system (RAS) for the WiBro system, and the receiver is a mobile station or a base station for the WiBro system.

4. The apparatus of claim 1, wherein the controller determines the bandwidth limit parameter in response to the transceiver receiving an automatic repeat request (ARQ) signal from the receiver.

5. A method of transmitting an orthogonal frequency division multiplexing access (OFDMA) symbol in an OFDMA system, comprising:

monitoring a received signal quality of a receiver;

determining a bandwidth limit parameter adaptively based on the monitored received signal quality of the receiver, wherein determining the bandwidth limit parameter adaptively includes:

determining when the currently received signal quality of the receiver is less than a previously received signal quality of the receiver;

when the currently received signal quality of the receiver is less than the previously received signal quality of the receiver determining whether a value to limit bandwidth less than a previous bandwidth limit parameter violates bandwidth limit requirements for the OFDMA system;

when the value to limit bandwidth less than the previous bandwidth limit parameter does not violate the bandwidth limit requirements, determining the bandwidth limit parameter as the value to limit bandwidth less than the previous bandwidth limit parameter, when the value to limit bandwidth less than the previous bandwidth limit parameter violates the bandwidth limit requirements, determining a modulation scheme that includes a low data rate, and the bandwidth limit parameter based on the determined modulation scheme that includes the low data rate, when the currently received signal quality of the receiver is better than the previously received signal quality of the receiver, determining whether a value to limit bandwidth more than the previous bandwidth limit parameter violates the bandwidth limit requirements for the OFDMA system, when the value to limit bandwidth more than the previous bandwidth limit parameter does not violate the bandwidth limit requirements, determining the bandwidth limit parameter as the value to limit bandwidth more than the previous bandwidth limit parameter, and when the value to limit bandwidth more than the previous bandwidth limit parameter violates the bandwidth limit requirements, determining a modulation scheme that includes a high data rate, and the bandwidth limit parameter based on the determined modulation scheme that includes the high data rate; and generating an OFDMA symbol based on the determined bandwidth limit parameter to transmit to the receiver.

6. The method of claim 5, wherein the bandwidth limit requirements have a bandwidth limit parameter such that a window is rectangular-shaped in time domain as a lower limit, and a maximal bandwidth limit parameter such that a curved portion of the window does not overlap the OFDMA symbol in frequency domain as an upper limit.

7. The method of claim 5, wherein the OFDMA system is an wireless broadband (WiBro) system, and the receiver is a mobile station or a base station for the WiBro system.

8. The method of claim 5, wherein monitoring the received signal quality of the receiver includes receiving an automatic repeat request (ARQ) signal from the receiver.

9. A non-transitory computer readable medium storing computer executable instructions thereon, the computer executable instructions, when executed in a computer, executing a method of transmitting an orthogonal frequency division multiplexing access (OFDMA) symbol in an OFDMA system, comprising:

monitoring a received signal quality of a receiver;

determining a bandwidth limit parameter adaptively based on the monitored received signal quality of the receiver, wherein determining the bandwidth limit parameter adaptively includes:

determining when the currently received signal quality of the receiver is less than a previously received signal quality of the receiver;

when the currently received signal quality of the receiver is less than the previously received signal quality of the receiver, determining whether a value to limit bandwidth less than a previous bandwidth limit parameter violates bandwidth limit requirements for the OFDMA system;

when the value to limit bandwidth less than the previous bandwidth limit parameter does not violate the bandwidth limit requirements, determining the bandwidth limit parameter as the value to limit bandwidth less than the previous bandwidth limit parameter, when the value to limit bandwidth less than the previous bandwidth limit parameter violates the bandwidth limit requirements, determining a modulation scheme that includes a low data rate, and the bandwidth limit parameter based on the determined modulation scheme that includes the low data rate, when the current received signal quality of the receiver is better than the previously received signal quality of the receiver, determining whether a value to limit bandwidth more than the previous bandwidth limit parameter violates the bandwidth limit requirements for the OFDMA system, when the value to limit bandwidth more than the previous bandwidth limit parameter does not violate the bandwidth limit requirements, determining the bandwidth limit parameter as the value to limit bandwidth more than the previous bandwidth limit parameter, and when the value to limit bandwidth more than the previous bandwidth limit parameter violates the bandwidth limit requirements, determining a modulation scheme that includes a high data rate, and the bandwidth limit parameter based on the determined modulation scheme that includes the high data rate; and generating an OFDMA symbol based on the determined bandwidth limit parameter to transmit to the receiver.

* * * * *